United States Patent [19]
Herz

[11] Patent Number: 5,937,893
[45] Date of Patent: Aug. 17, 1999

[54] SHIELD FOR PRESSURE RELIEF DEVICE

[75] Inventor: Joshua J. Herz, Rochester, N.Y.

[73] Assignee: Qualitrol Corporation, Fairport, N.Y.

[21] Appl. No.: 08/863,155

[22] Filed: May 27, 1997

[51] Int. Cl.⁶ .................................................. F16K 35/00
[52] U.S. Cl. ...................... 137/382; 137/377; 137/557; 137/315; 220/664; 220/724
[58] Field of Search ..................... 137/377, 382, 137/557, 315; 220/724, 664

[56] References Cited

U.S. PATENT DOCUMENTS

| | | | |
|---|---|---|---|
| 5,058,758 | 10/1991 | Suddeth | 137/382 |
| 5,529,089 | 6/1996 | Hicks et al. | 137/382 |
| 5,687,757 | 11/1997 | Heintz et al. | 137/377 |

OTHER PUBLICATIONS

Shroud Oil Deflector Kit—Westinghouse Canadian Services Division Buletin—date unknown.

Transformer Relief Valve—TX 135. Pyropress Engineering Company Ltd. Bulletin and Drawing—date unknown.

Primary Examiner—A. Michael Chambers
Attorney, Agent, or Firm—Cumpston & Shaw

[57] ABSTRACT

A shield for a pressure relief device for containing and deflecting released fluids is described. The shield includes an enclosure for surrounding the pressure relief device, the enclosure having a first port for engaging the enclosure to a relief duct while permitting the shield to be positioned in a necessary orientation on the device.

33 Claims, 8 Drawing Sheets

SHIELD FOR PRESSURE RELIEF DEVICE

FIELD OF THE INVENTION

This invention relates to a shield for a pressure relief device for containing and deflecting released fluids and in particular to a shield which engages a relief duct while permitting the shield to be positioned in a necessary orientation on the device.

BACKGROUND OF THE INVENTION

Pressure relief devices for allowing pressurized dielectric fluid to escape from a transformer housing if the pressure in the housing increases, due either to an increase in ambient temperature or a fault in the transformer, have been known for many years. Known pressure relief devices of a particularly desirable type are designed so that once the release pressure is reached, a considerable amount of fluids, such as hot oil and gas, are released by the pressure release device in a very short time to rapidly reduce the pressure in the transformer housing, and prevent the housing from rupturing.

While high voltage transformers are often found in distribution facilities that are not manned, service must be performed from time to time and when operating personnel are working close to the transformers, the possibility for the release of fluid from a transformer during a fault is present. Typically when fluid is released it is extremely hot, possibly flaming, and poses a grave risk to anyone working close by. Pressure relief devices with integral shields for directing fluid released by the device to a ducting system are known.

Pressure relief devices, even devices of the same type are fitted to transformer housings in a variety of arrangements. More specifically, pressure relief devices are commonly provided with switches for sensing when the devices have been actuated and remotely signaling an operator, so that the cause for the excess pressure can be investigated. The position of such a switch on a pressure relief device may be different from one installation to another with respect to the possible orientation of a duct for receiving released fluid, and therefore a shield must have the capability of being oriented with respect to the pressure relief device and the switch in an orientation that permits coupling to the ducting, no matter how the pressure release device itself is oriented.

Pressure relief devices are typically fastened to transformer housings with a plurality of bolts or screws arranged in a circle. Where, as is common, six bolts are used, six different orientations of the switch, 60° apart can be achieved. However, sometimes this is not precise enough to obtain the desired orientation of a shield with respect to the device, and a position between the positions available by selection of a mounting position on the circle must be utilized.

In addition to providing a device that accommodates the orientation of a switch wherever it may be found, it is desirable to provide a shield that allows the switch to be reset by an operator when a fault occurs. This requires manually operating the switch, and it is essential that the shield not interfere with such operation. Since the orientation of the switch with respect to the duct is arbitrary, it is not always possible to provide a fixed access opening in an integral shield for resetting the switch.

It is desirable to provide a shield that accommodates switch resetting in whatever orientation the switch might be found.

Many pressure relief devices are in service that would be prohibitively expensive to replace with integrally shielded devices. There is a need, therefore, for a versatile shield that can be retrofitted to pressure relief devices already installed on transformers.

SUMMARY OF THE INVENTION

In accordance with a presently preferred embodiment of this invention there is provided a shield for a pressure relief device having an enclosure for surrounding the pressure relief device, the enclosure having a first port for connecting the enclosure to a relief duct and a second port; a first seal for sealing the enclosure to a mounting surface; a removable cover fixedly attachable to the pressure relief device, the cover having a surface for sealing to the second port, and a second seal for sealing the cover to the second port.

In another aspect of the invention there is provided a shield for a pressure relief device including a peripheral wall surrounding a pressure release device having an edge sealably engaging a transformer housing mounting surface, a generally semi-cylindrical wall portion, a generally flat wall portion having a port therein for coupling expelled fluids to a relief duct, and first and second transitional wall portions connecting the semi-cylindrical wall portion to the flat wall portion; a generally flat upper surface attached to the peripheral wall, having a generally circular port therein; a circular cover engaging the circular port in the upper surface, having a flange for permitting the cover to rotate relative to the circular port; and a plurality of fasteners engaging the cover and the pressure relief device for fixedly securing the cover to the pressure relief device while permitting the peripheral wall to be rotated relative to the pressure relief device to orient the flat wall portion to any desired position.

In yet another aspect of the invention there is provided a shield for a pressure relief device including a peripheral wall surrounding the pressure relief device having an edge sealably engaging a transformer housing mounting surface, four generally rectangular integral wall portions and a generally flat upper surface integral with the wall portions; a port in one of the four wall portions for coupling expelled fluids to a relief duct; a seal for sealing the edge to a mounting surface; a plurality of holes in the upper surface, each one of the plurality of holes in alignment with an existing fastening hole of the pressure relief device; and a fastener mounted to each one of the plurality of holes for attaching the upper surface to an existing fastening hole of the pressure relief device and fixedly securing the shield to the pressure relief device.

In yet another aspect of the invention there is provided a shield for a pressure relief device including a peripheral wall surrounding the pressure relief device having top and bottom edges, a generally flat wall portion and a port in the flat wall portion for coupling expelled fluids to a relief duct; a generally flat upper surface integral with the top edge of the peripheral wall; an adapter plate removably attached to the bottom edge of the peripheral wall, the adapter plate having an upper surface, a lower surface, an opening extending through the plate, and a peripheral edge around the plate; a first groove in the peripheral edge; a seal in the first groove for sealing the peripheral edge to the peripheral wall; and a second groove in the peripheral edge between the first groove and the lower surface.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF A PREFERRED EMBODIMENT

Pressure relief devices (PRD's) for transformers, such as QualiTROL models 208 and 213 available from QualiTROL Corporation, Fairport, N.Y., are typically attached to a transformer housing or tank by means of a flange and several bolts or screws. A cover encloses a release valve of the PRD and is fastened firmly to the flange by a number of screws. The release valve is held closed under normal working pressures by a compressed spring which is held in place by the cover. The following descriptions are for shields designed to be used with QualiTrol PRD devices but it will be readily apparent to those with ordinary skill in this field that such shields can be adapted for use with other makes and models of PRD's and such modifications are therefore contemplated by the invention.

Figure 1:
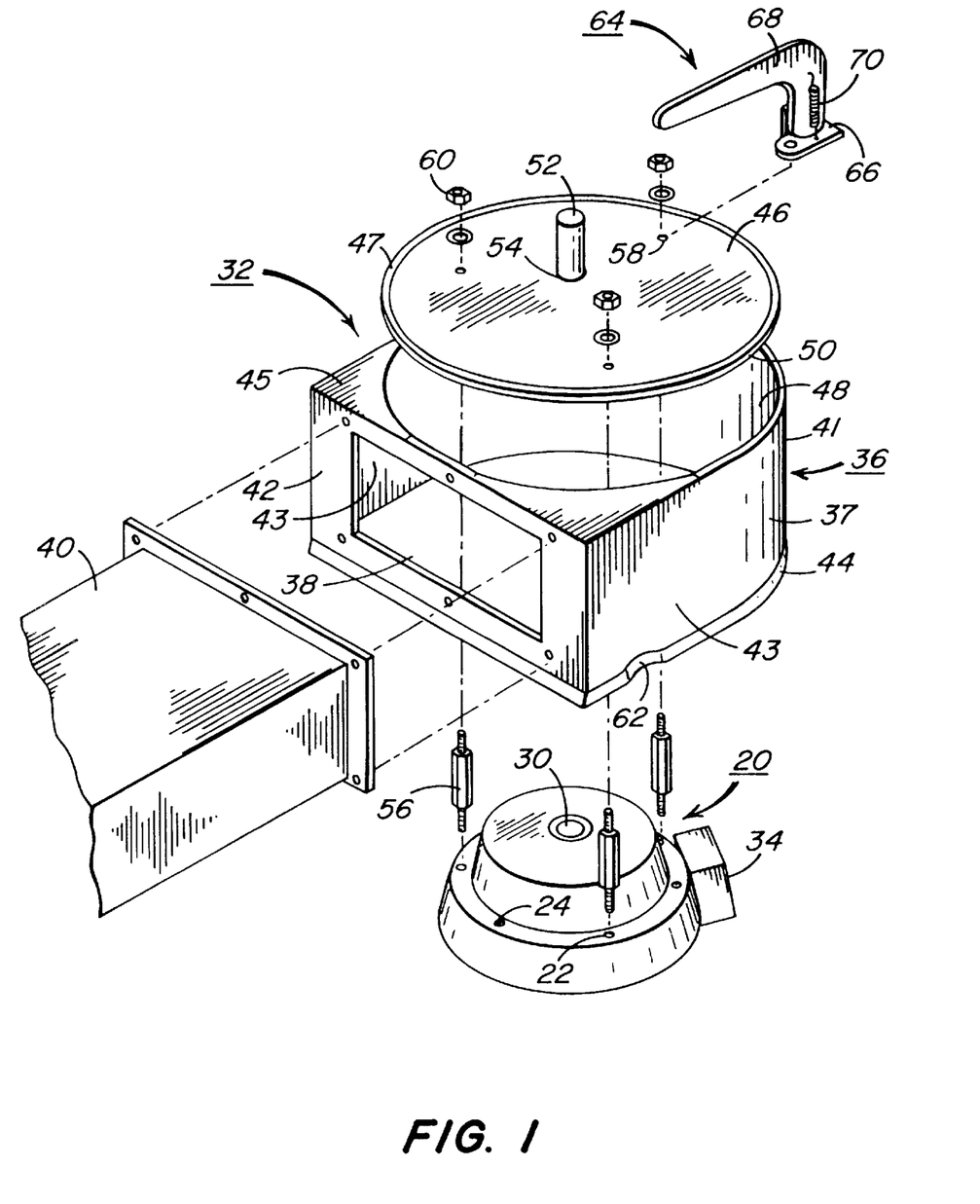
FIG. 1 is a perspective view of a first embodiment of a shield with indicator.
Figure 2:
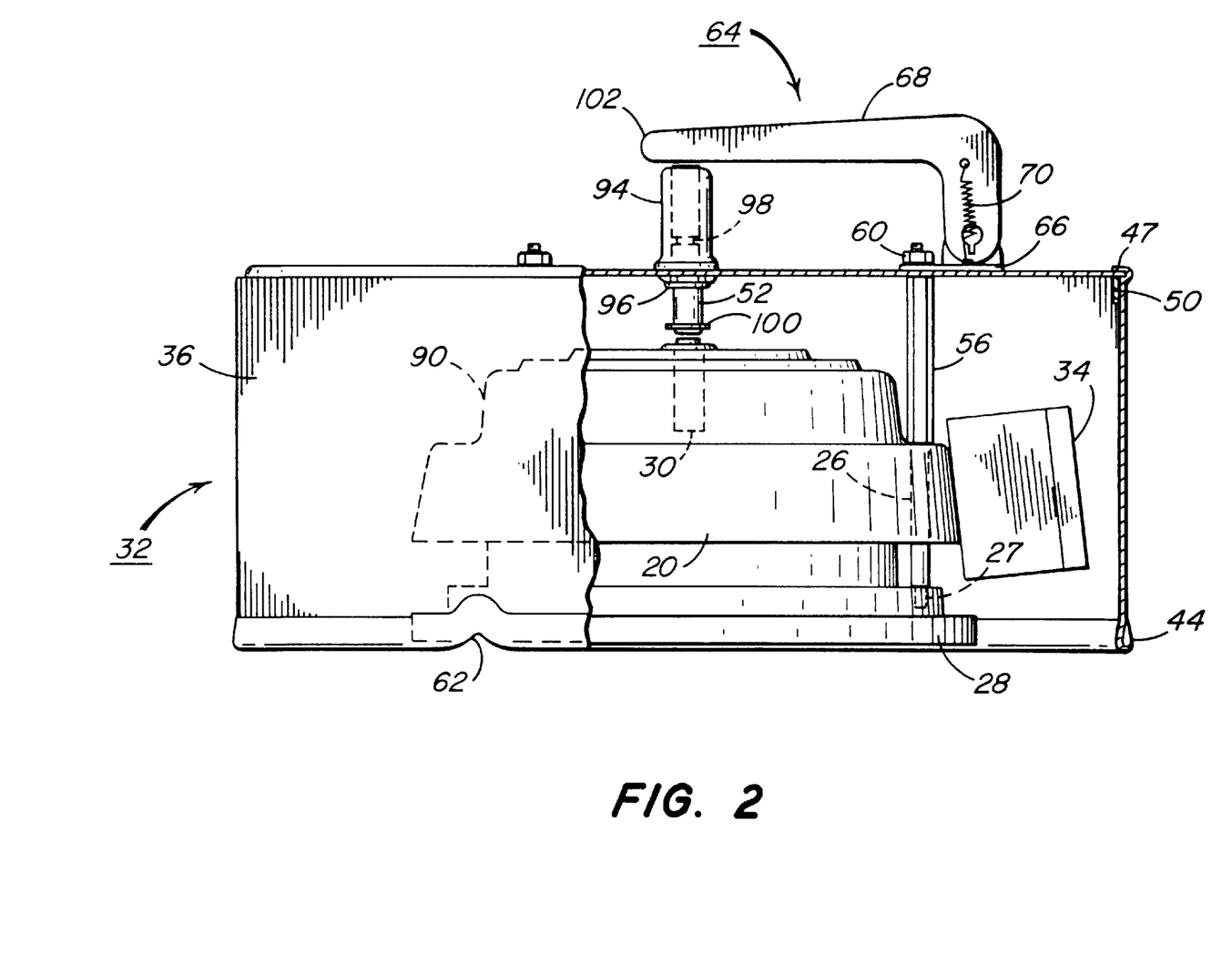
FIG. 2 is a partial side view of a shield with indicator and semaphore.

Referring to FIGS. 1 and 2, there is shown a preferred PRD cover 20 with a ring of six symmetrically placed holes 22. The cover is normally mounted with six screws 24, one screw in each hole 22, which connect the cover to six male/female standoffs 26. The standoffs 26 are in turn screwed into six fastening holes 27 in a flange 28 of the PRD. An indicator 30 is located in the center of the cover 20.

When the pressure of the fluids in the tank exceeds the safe limit a PRD valve under the cover opens and the fluids escape between the cover and the flange and spray in all directions. Opening of the relief valve also causes the indicator 30 to rise and serve as a visual warning that the pressure has been exceeded. With such a PRD the escaping fluids are not contained and present a hazardous condition to equipment and personnel in the area. Such fluid emissions add to the time and cost of clean-up and resetting of the equipment.

It is desirable to contain the escaping fluids, preferably by directing the spray downwards and away from service personnel or, more preferably, into a suitably positioned relief duct which can convey the fluids to a containment vessel for disposal. A shield for the PRD should be capable of being oriented in different positions to accommodate any limitations on placement of the ducts in different work locations. Such an enclosure should also provide access to any sensing switches on the PRD which need to be reset.

Referring again to FIGS. 1 and 2, there is shown a shield 32 for attaching to the PRD cover 20. The PRD to be shielded can be either a new installation or an existing installation. The PRD cover 20 also includes a resettable sensing switch 34 of the PRD which is tripped when the relief valve is actuated. The shield 32 includes an enclosure 36 having a peripheral wall 37 which surrounds the PRD and a port 38 in the enclosure 36 for attaching to a relief duct 40. The enclosure 36 is large enough to fit over the cover 20 and the switch 34 and seal with a tank to which the PRD is attached. The shape of the enclosure 36 can be any suitable shape, for example rectangular, semi-circular, circular or curvilinear, which can accommodate the shapes of the relief duct 40, the PRD cover 20 and any other features, for example the switch 34.

In a preferred embodiment the wall 37 is generally U-shaped having a semi-cylindrical wall portion 41 integrally connected with a rectangular-shaped flat side 42 by transitional wall portions 43. The flat side 42 has a rectangular-shaped port 38 for fitting to a rectangular-shaped duct 40. However, depending on the shape of the duct other shaped ports can be used. The enclosure 36 includes a sealing gasket 44 around a bottom edge for sealing with the tank. The upper surface 45 of the shield 32 is also provided with a removable circular cover 46 with a flange 47 for closing a circular-shaped second port 48 of the enclosure 36. The flange 47 is sealed to the port 48 with a second gasket 50. A tubular-shaped indicator 52 is mounted in an opening 54 of the cover 46 so that it is aligned with the PRD indicator 30 and will respond to actuation of indicator 30.

Because of the high forces involved the PRD cover 20 is connected to fastening holes 27 in a flange 28 of the PRD with several screws. In a typical arrangement for a circular PRD, the PRD cover 20 is attached to the flange with six screws 24 symmetrically arranged at 60° intervals around the cover 20 and at a fixed radius from the center of the cover. This arrangement distributes the compression force of the cover evenly around the cover and holds the spring down and the release valve closed. However, it is possible to remove three alternating screws of the cover, preferably one at a time, and temporarily hold down the spring and release valve under normal working pressures while a shield is installed.

To install the shield 32, three alternating screws 24 are removed from the PRD cover 20, preferably one at a time, and replaced with three fasteners such as studs 56. Preferably, both ends of the studs 56 are provided with male threads. One end of each stud 56 is screwed into the male/female standoff 26 below the existing hole 22 in the PRD cover 20. The standoff 26 is screwed to the flange 28 below. Thus the PRD cover 20 is again retained by a circle of six fasteners, three screws 24 and three studs 56, providing sufficient strength to resist unexpected increases in pressure. The enclosure cover 46 is provided with three holes 58 at 120° intervals around the enclosure cover 46 and at a fixed radius from the center of the cover 46, the radius being selected so that the holes 58 are aligned with the studs 56 and the enclosure cover 46 can thus be mounted to the studs 56 with nuts 60. By tightening the studs 56 and nuts 60 the cover 46 is sealed to the enclosure 36 and the enclosure 36 is sealed against the tank.

Since the enclosure cover 46 is circular and is connected directly to the studs 56 the enclosure 36 can be rotated freely and oriented in any position for connection with a relief duct 40. This feature is particularly useful for retrofitting a shield to an existing PRD installation because it allows greater latitude for locating the relief duct.

The position of a PRD sensing switch 34 on the PRD is arbitrary and is not limited to accessibility through the duct port 38 since the enclosure cover 46 can be safely removed by unscrewing the three nuts 60 to give access to the switch 34. This allows even more freedom for orienting the shield 32. The enclosure 36 is optionally provided with a notch 62 in the bottom edge for leading switch wiring cable through the shield 32. In original installations of a protective shield the wiring cable is preferably led through a cable gland mounted in the shield 32.

In some installations an additional port and removable cover in the wall of the shield is provided for access to the switch. In other installations where space is limited and a small, close-fitting shield is desired the switch is mounted externally to the shield rather than to the PRD cover.

In many PRD installations the PRD is provided with a semaphore 64 having a base 66, an arm 68 and a retaining spring 70. The semaphore 64 is originally attached to the PRD cover 20 by one of the screws 24 and is actuated by the indicator 30. The semaphore 64 provides an enhanced visual warning that the PRD valve has been actuated. It is an additional feature of the shield 32 of the invention that an existing semaphore 64 can be removed from an existing PRD and re-attached to the enclosure cover 46 by one of the studs 56 and nuts 60. The semaphore 64 can thus be actuated by the tubular-shaped indicator 52.

Such a shield 32 is readily retrofitted to existing PRD installations or fitted with new PRD installations.

Figure 3:
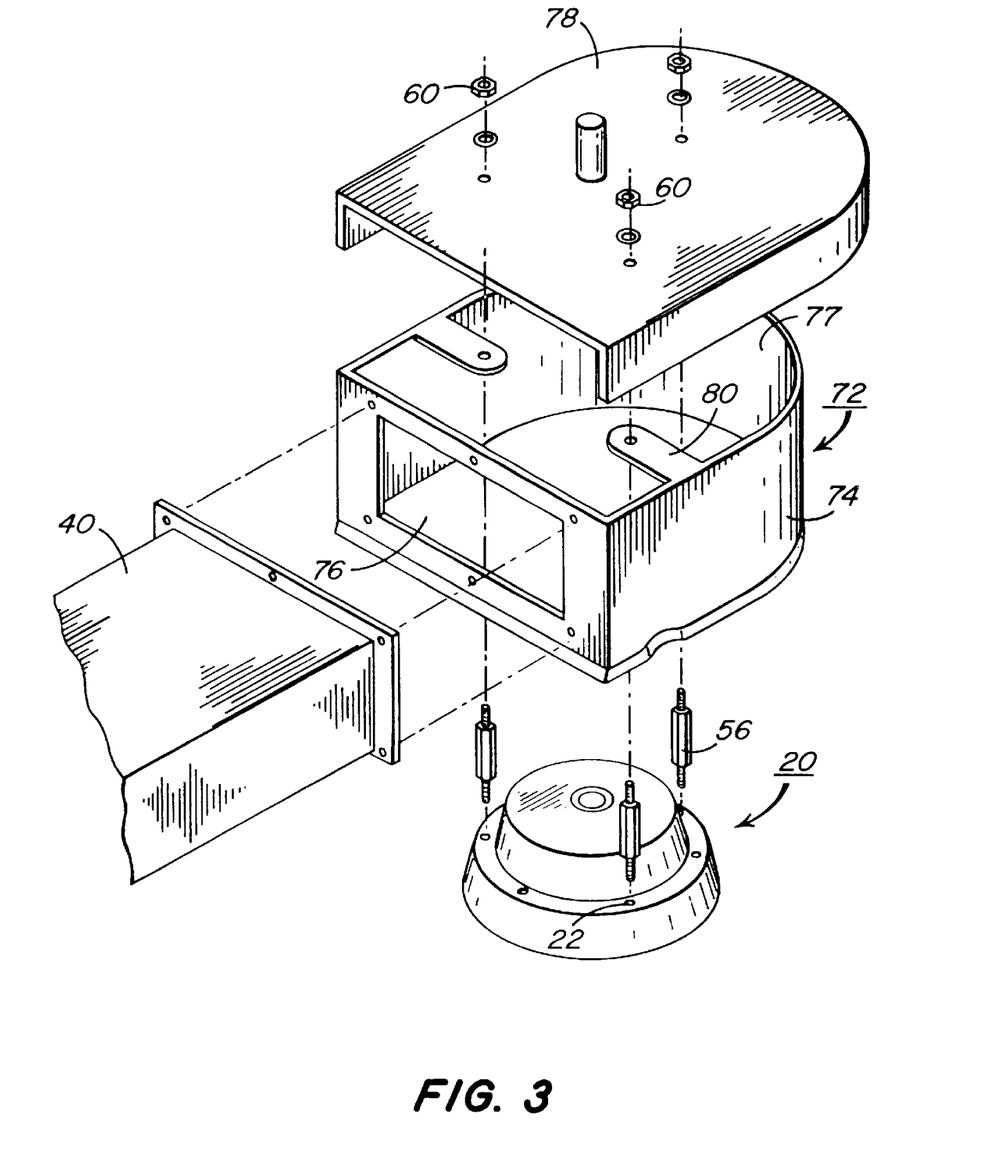
FIG. 3 is a perspective view of a second embodiment of a shield with indicator.

Referring to FIG. 3, there is shown an alternative U-shaped shield 72 having an enclosure 74 with a port 76 for connecting to a duct 40 and a U-shaped port 77. The enclosure 74 includes a sealing gasket 75 around a bottom edge for sealing with the tank. The enclosure 74 has a U-shaped cover 78 which fits over the port 77 and is attached to mounting tabs 80 on the enclosure 74 with nuts 60 and studs 56. The studs 56 are in turn connected to the standoffs below the holes 22 in the PRD cover 20 and hence to the underlying flange. In this embodiment the shield can only be oriented in six positions at 60° increments since the enclosure 74 and cover 78 are fixedly attached to each other.

Referring again to FIG. 2, there is shown a partial view of the shield 32 with the enclosure 36 partially removed to show a PRD 90. The PRD 90 includes a cover 20, flange 28 and switch 34. The indicator 30 is mounted in the PRD cover 20. The enclosure 36 includes sealing gasket 44 and cover 46 having a flange 47 and a gasket 50 for sealing the cover 46 to the enclosure 36. The enclosure cover 20 is connected to alternating standoffs 26 by studs 56. Each stud 56 is screwed into a male/female standoff 26 and each standoff is in turn screwed into a fastening hole 27 in the flange 28.

A preferred embodiment of an enclosure indicator 52 is mounted to the enclosure cover 46 by means of a bushing 94 which is fastened to the enclosure cover 46, preferably by means of a threaded screw on the end 96 of the bushing 94. The enclosure tubular-shaped indicator 52 includes a friction ring 98 and a flange 100. The base 66 of the semaphore 64 is mounted to the enclosure cover 46 by one of the studs 56 so that the tip 102 of arm 68 is positioned immediately above the enclosure indicator 52 The bushing 94 provides the additional height necessary to have the semaphore 64 rest in a horizontal position when unactuated. In operation the enclosure indicator 52 is aligned with the existing PRD indicator 30 so that on actuation of the PRD valve the existing indicator 30 impinges on the enclosure indicator 52 causing it to move up until the flange 100 contacts the end 96 of the bushing 94. Simultaneously the tip 102 is pushed up by the enclosure indicator 52 so that the arm 68 moves from a horizontal to a vertical position to visually signal the operator that the PRD valve has been actuated.

Figure 4:
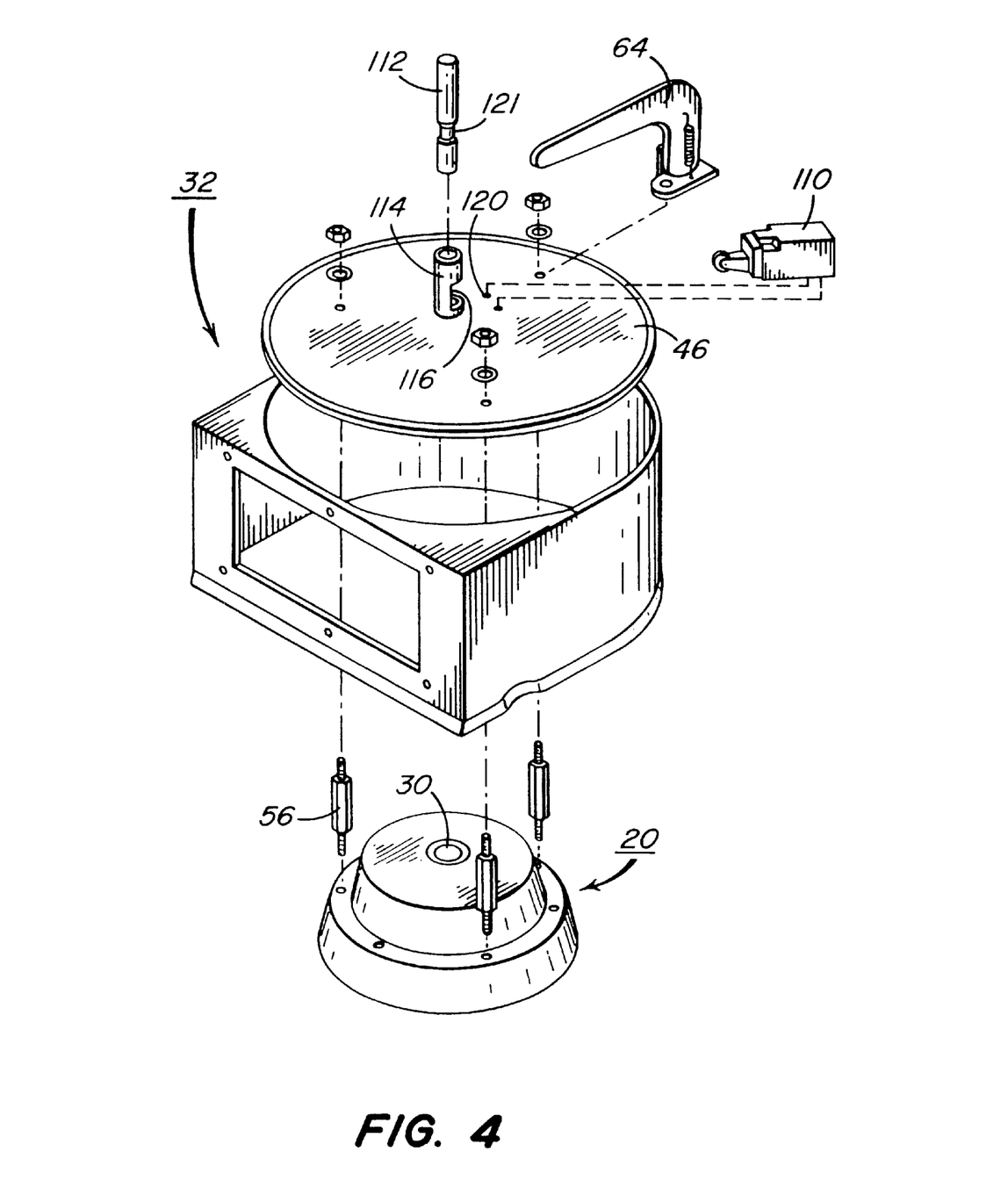
FIG. 4 is a perspective view of an embodiment of a shield having an indicator and an external sensor switch.

Referring to FIG. 4, there is shown an alternative embodiment of the protective shield 32 for a PRD in which a resettable sensing switch 110 is not attached to the PRD cover 20 but is attached to the removable shield cover 46. In this embodiment an enclosure tubular-shaped indicator 112 is mounting to the enclosure cover 46 by means of a cylindrical bushing 114. The bushing 114 has a notch 116 cut out of the cylinder wall into which a switch arm 118 from the switch 110 is inserted when the switch 110 is mounted in the holes 120 of the shield cover 46. The tip of the switch arm contacts an annular groove 119 in the indicator 112. Activation of the enclosure indicator 112 causes it to slide up and an edge of the groove trips the switch arm 118. The switch can be readily checked or reset without moving the cover. The shield 32 is optionally provided with a notch 134 in the bottom edge for leading switch wiring cable through the shield. In original installations of a protective shield the wiring cable is preferably led through a cable gland mounted in the shield 32.

Transformer tanks can have different surface configurations, some of which may not accommodate the mounting of a PRD directly to the surface of the tank. In some installations it is necessary to weld a plate to the tank and mount the PRD to the plate by means of threaded holes in the plate. The plate would have an opening to accommodate the PRD. In such cases a standard protective shield mounted over the PRD would not be flush with the surface of the tank and released oil would escape through a gap between the bottom of the shield and the tank. In such installations it is necessary to insert an adapter plate between the welded mounting plate and the shield. The adapter plate surface is made wide enough to seal with the protective shield and has an opening to accommodate the PRD. Alternatively, the protective shield can be customized to seal with the tank without installing an adapter plate.

Figure 5:
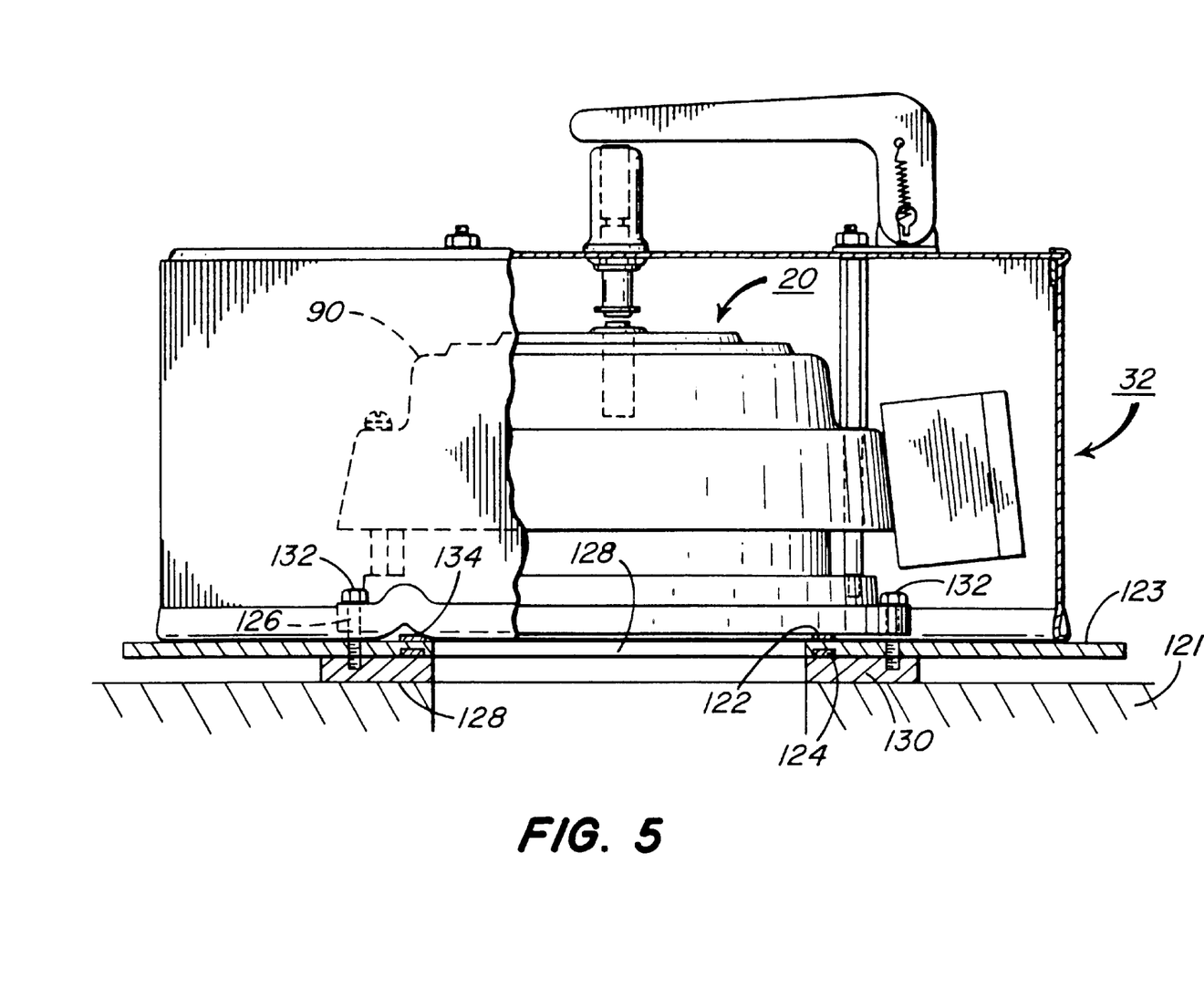
FIG. 5 is a partial side view of a shield with indicator and having an adapter mounting plate.

Referring now to FIG. 5, there is shown a protective shield 32, similar to that described in FIG. 2, which is mounted to a PRD 90 in the same manner as described for FIG. 2. However, the PRD 90 is sealed to an adapter plate 120 rather than a mounting surface of a tank 121. The adapter plate 120 is provided with gaskets 122, 124, mounted in grooves in the top and bottom surfaces of the plate, bolt clearance holes 126 and an opening 128 for accommodating the PRD 90. The adapter plate 120 is mounted to a mounting surface on the tank, such as welded plate 130, by bolts 132. The gasket 122 provides a seal between the PRD and the adapter plate, and the gasket 124 provides a seal between the adapter plate and the mounting surface. Such an adapter plate 120 can be used with all versions of the shield, such as those described for FIGS. 1–6.

Figure 6:
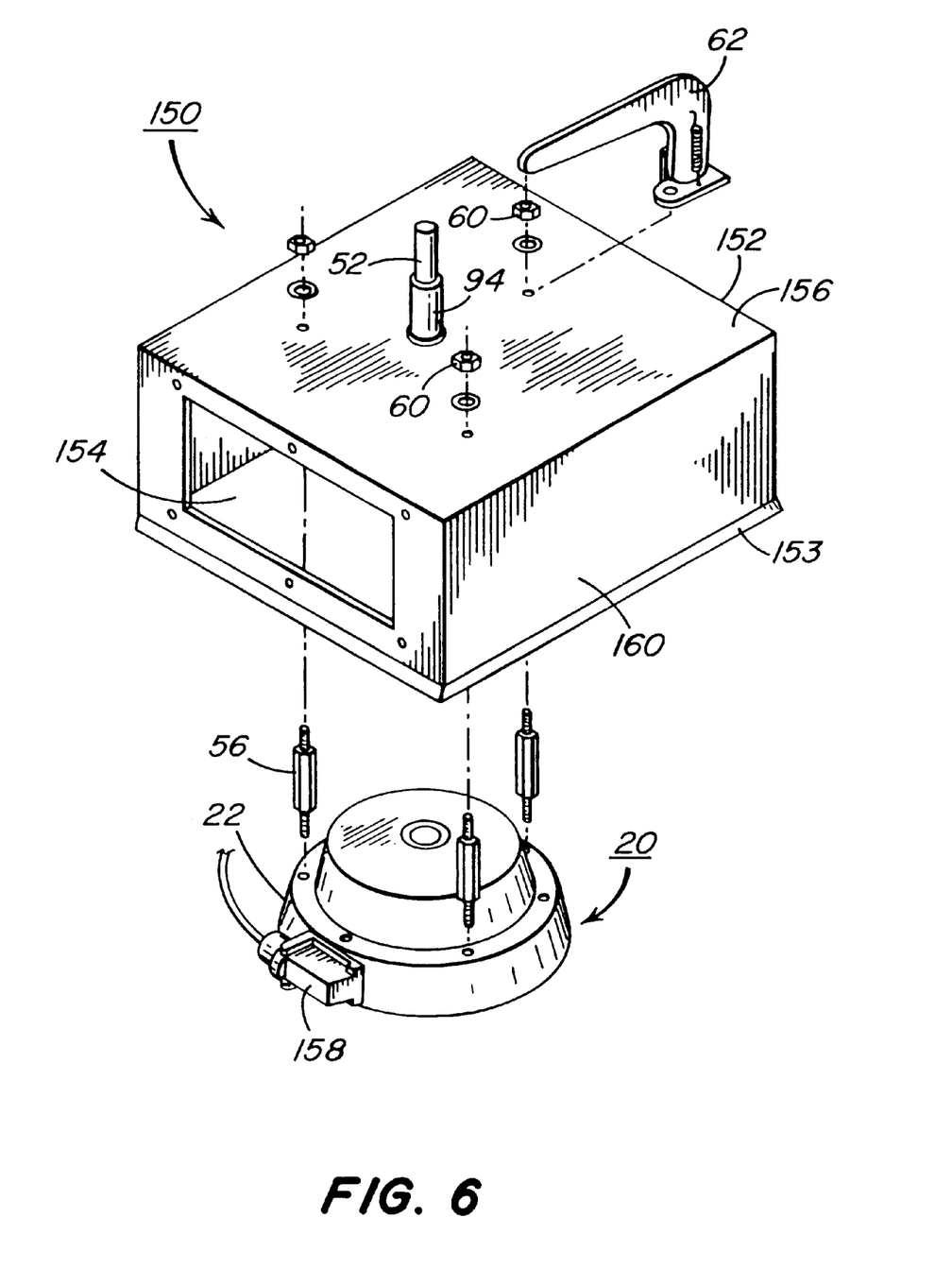
FIG. 6 is a perspective view of a third embodiment of a shield.

Referring to FIG. 6, there is shown a limited position protective shield 150 which is field retrofittable and can be mounted to an existing PRD to direct spray in six different directions at 60° increments. The shield 150 is in the form of a rectangular-shaped enclosure 152 having a port 154 for connecting to a duct. The enclosure 152 includes a sealing gasket 153 around a bottom edge for sealing with the tank. The top side 156 of the enclosure 152 is attached to studs 56 which are in turn connected to the standoffs below the holes 22 in the PRD cover 20. A tubular-shaped indicator 52 is mounted in a bushing 94 on the top side 156. A semaphore 64 can be attached to the top side 156 by a nut 60 and a stud 56. The shield is large enough to enclose the PRD cover 20 and an alarm switch 158 attached to the PRD cover 20. A PRD and the shield 150 are preferably oriented so that the alarm switch 158 is positioned adjacent to the port 154 and the shield does not have to be removed to reset the switch.

The shield 150 is provided with a sealing gasket around the bottom edge 160 of the box 152 for sealing with a transformer housing mounting surface or an adapter plate. The rectangular-shaped shield is readily formed from sheet metal.

A shield of the invention can also be formed by casting, for example, by making a metal cast of the shield in one or more pieces.

In some installations there is limited space around the PRD and a smaller, close fitting shield is desirable. In such installations the sensing switch is usually mounted on the outside of the shield.

Figure 7:
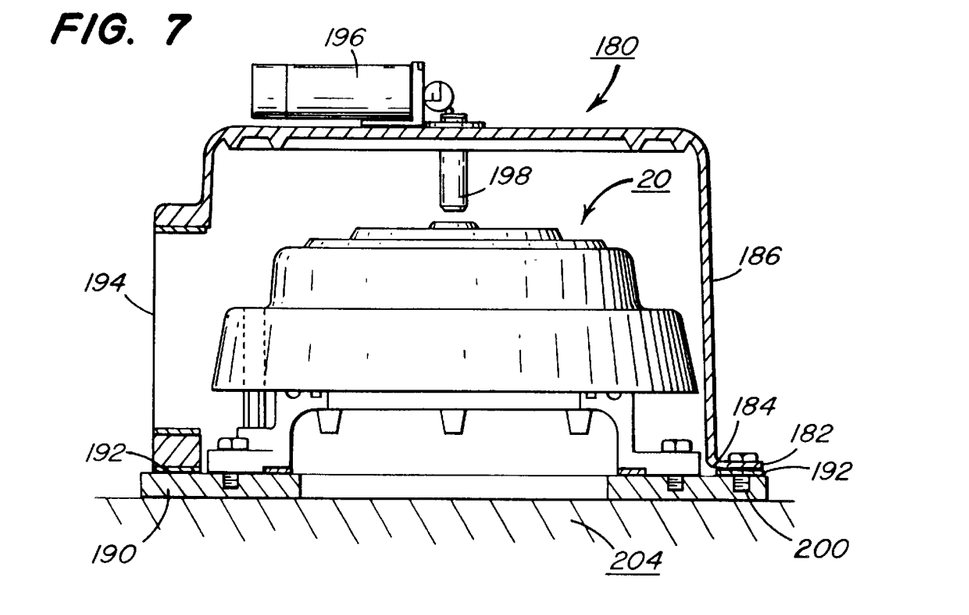
FIG. 7 is a partial side view of a shield with a flange mounting.

Referring to FIG. 7, there is shown another one-piece protective shield 180, preferably formed by a casting process, for a PRD 20. The shield 180 has an integral mounting flange 182 surrounding the bottom edge 184 of the wall 186 and perpendicular to the wall 186. The flange is provided with a plurality of mounting holes and bolts 188 therein for attaching the shield to an existing tank mounting flange 190. A gasket 192 provides a seal between the two flanges. The shield 180 has a relief port 194, an external sensing switch 196 and an indicator 198. In this version of the shield there is no need to utilize the studs of the PRD to mount the shield. The shield 180 is especially suitable for new PRD installations and can be positioned in any desired orientation by providing several tapped holes 200 in the original mounting flange 190 of tank 204 which align with the corresponding mounting holes and bolts 188.

Figure 8:
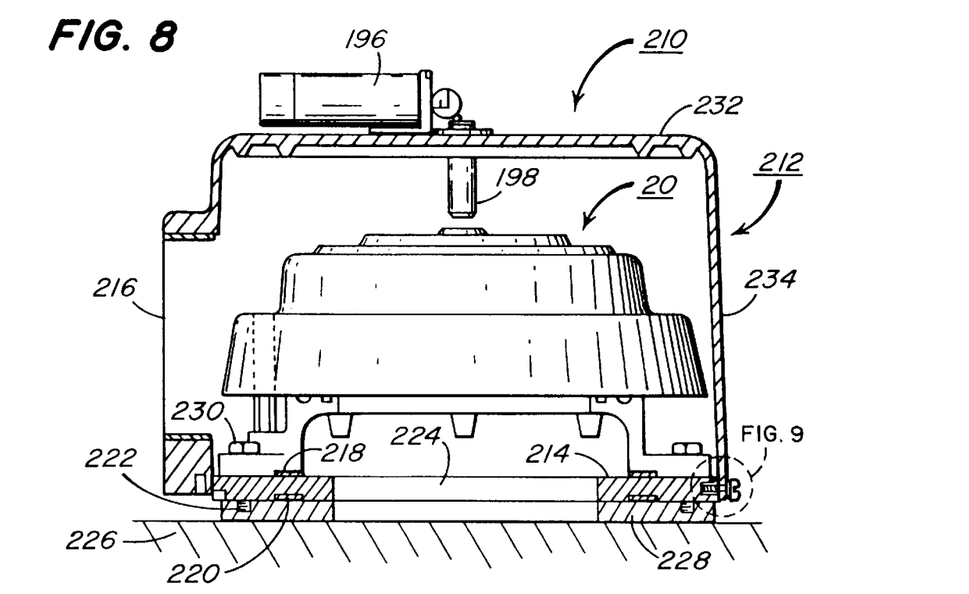
FIG. 8 is partial side view of a rotatable shield.
Figure 9:
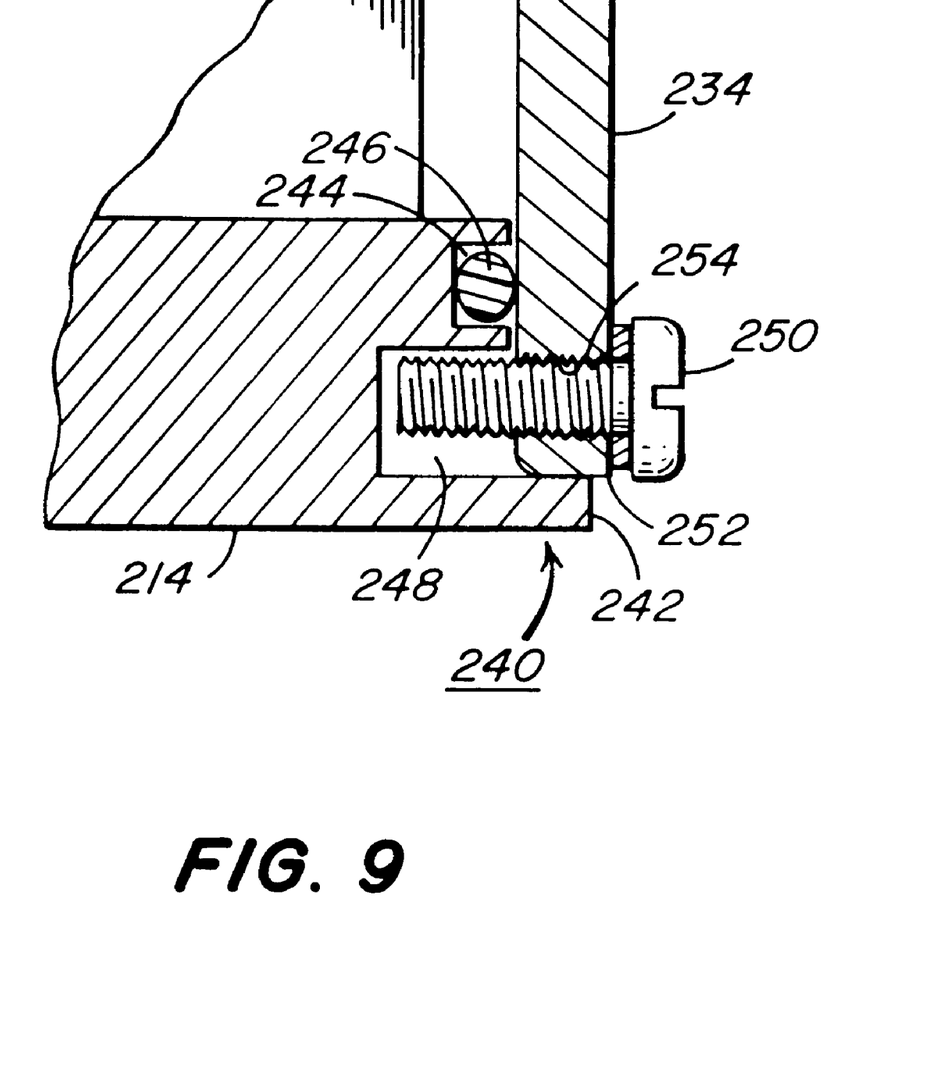
FIG. 9 is an enlarged view of a portion of the shield of FIG. 8.

Referring now to FIGS. 8 and 9, there is shown another version of a protective shield 210 for a PRD 20. The shield 210 includes an enclosure 212 and an adapter plate 214. The enclosure 212 has a port 216 for connecting to a duct. The adapter plate 214 is provide with gaskets 218, 220 mounted in grooves in the upper and lower surfaces of the plate, bolt clearance holes 222 and an opening 224 for accommodating the PRD 20. The adapter plate 214 is mounted to a welded plate 228 on the tank 226 by bolts 230. The enclosure 212 has a flat upper surface 232 integral with a peripheral wall 234 which surrounds the PRD. A tubular-shaped indicator 198 and an external sensing switch 196 can be mounted on the upper surface 232.

As shown in FIG. 9, which is an enlarged view of the area 9—9 of FIG. 8, the edge 240 of the adapter plate 214 is provided with a ledge 242 extending out from and around the bottom surface of the plate. A first groove 244 in and around the edge 240 holds a seal 246. A second groove 248 in and around the edge 240 between the ledge 242 and the first groove 244 accepts a fastening bolt 250. Adjacent to the bottom edge 252 of the peripheral wall there are provided a plurality of tapped mounting holes 254 for holding the bolts 250 and aligning the bolts 250 with the second groove 248. The enclosure 212 and the adapter plate 214 are engineered so that there is minimal clearance between the peripheral wall 234 and the edge 240. The seal 246 in the first groove 244 thus seals tightly with the wall 234. When the bottom edge 252 of the wall 234 is pushed over the seal 246 and against the ledge 242 the bolts 250 are screwed through the mounting holes 254 so that they extend into the second groove 248 and hold down the enclosure 212. Since the groove 248 extends around the plate 214 the enclosure 234 can be rotated and oriented in any direction for coupling the port 216 to a duct.

A protective shield of the invention can be formed from any suitable metal or plastic materials which are strong enough to withstand the temperatures and pressures involved and are resistant to the environment, for example, metals such as steel or aluminum. The sealing gaskets and friction rings are preferably made of oil resistant elastomeric materials, such as neoprene and nitrile rubbers.

A preferred shield of the invention can be readily oriented with respect to a PRD and ductwork and can be readily retrofitted to existing PRD's. Such retrofitted shields are less expensive to install than integrally shielded pressure relief devices. In some embodiments the shield can be retrofitted without removing the PRD by using studs connected between the PRD and the enclosure cover. In some embodiments the two-piece design of the shield allows for access to an alarm switch equipped PRD's without removing the ductwork. A preferred shield permits use of a visual semaphore, and an existing semaphore of an unshielded PRD can be remounted on the shield.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A shield for a pressure relief device comprising:
   (a) an enclosure for surrounding the pressure relief device, the enclosure having a first port for connecting the enclosure to a relief duct and a second port;
   (b) a first seal for sealing the enclosure to a mounting surface; and
   (c) a removable cover fixedly attachable to the pressure relief device, the cover having a surface for sealing to the second port.

2. The shield of claim 1, further comprising a second seal for sealing the cover to the second port.

3. The shield of claim 1, in which the cover has a plurality of holes in alignment with an existing plurality of fastening holes of the pressure relief device.

4. The shield of claim 3, further comprising a fastener mounted to each one of the plurality of holes for attaching the cover to an existing one of the plurality of fastening holes of the pressure relief device.

5. The shield of claim 1, further comprising an indicator attached to the cover and moveable in response to actuation of the pressure relief device.

6. The shield of claim 5, further comprising a semaphore mounted to one of the plurality of holes and moveable in response to actuation of the indicator.

7. The shield of claim 1, in which the cover is circular.

8. The shield of claim 7, in which the cover has a plurality of holes there through arranged symmetrically around the cover at a fixed radius from a center of the cover, each one of the plurality of holes in alignment with an existing fastening hole of the pressure relief device.

9. The shield of claim 8, further comprising a stud mounted to each one of the plurality of holes for attaching the cover to an existing fastening hole of the pressure relief device.

10. The shield of claim 1, in which the removable cover is in addition fixedly attachable to the enclosure.

11. The shield of claim 1, further comprising an adapter plate having an upper surface for engaging the first seal, an opening extending through the plate, a first gasket mounted to the upper surface and surrounding the opening for sealing a pressure relief device to the plate, and a second gasket mounted to a lower surface of the plate and surrounding the opening, for sealing the plate to a mounting surface.

12. A shield for a pressure relief device that is mounted on a transformer housing comprising:

(a) a peripheral wall surrounding a pressure release device having an edge sealably engaging a transformer housing mounting surface, a generally semi-cylindrical wall portion, a generally flat wall portion having a port therein for coupling expelled fluids to a relief duct, and first and second transitional wall portions connecting the semi-cylindrical wall portion to the flat wall portion;

(b) a generally flat upper surface attached to the peripheral wall, having a generally circular port therein;

(c) a circular cover engaging the circular port in the upper surface, having a flange for permitting the cover to rotate relative to the circular port; and (d) a plurality of fasteners engaging the cover and the pressure relief device for fixedly securing the cover to the pressure relief device while permitting the peripheral wall to be rotated relative to the pressure relief device to orient the flat wall portion to any desired position.

13. The shield of claim 12, in which the cover has a plurality of holes arranged symmetrically around the cover at a fixed radius from a center of the cover for receiving the plurality of fasteners, each one of the plurality of holes in alignment with an existing fastening hole of the pressure relief device.

14. The shield of claim 13, in which one of the plurality of fasteners is mounted to each one of the plurality of holes for attaching the cover to an existing fastening hole of the pressure relief device.

15. The shield of claim 12, further comprising a first seal for sealing the edge to a transformer housing mounting surface.

16. The shield of claim 12, further comprising an adapter plate having an upper surface for engaging the first seal, an opening extending through the plate, a first gasket mounted to the upper surface and surrounding the opening for sealing a pressure relief device to the plate, and a second gasket mounted to a lower surface of the plate and surrounding the opening, for sealing the plate to a transformer mounting surface.

17. The shield of claim 12, further comprising a second seal for sealing the flange to the circular port.

18. The shield of claim 12, further comprising an indicator attached to the cover and moveable in response to actuation of the pressure relief device.

19. The shield of claim 18, further comprising a semaphore mounted to one of the plurality of holes and moveable in response to actuation of the indicator.

20. The shield of claim 12, further comprising a sensor switch mounted on the removable cover, the switch having a protruding switch arm.

21. The shield of claim 20, further comprising a cylindrical bushing mounted in the removable cover, a tubular-shaped indicator slidably mounted in the bushing, a notch in a portion of a wall of the bushing for receiving the switch arm, and an annular groove in the indicator for slidably contacting a tip of the switch arm and tripping the switch.

22. A shield for a pressure relief device comprising:

(a) a peripheral wall surrounding the pressure relief device having an edge sealably engaging a transformer housing mounting surface and a generally flat wall portion having a port therein for coupling expelled fluids to a relief duct;

(b) a generally flat upper surface integral with the peripheral wall; and a seal for sealing the edge to a mounting surface.

23. The shield of claim 22, in which the upper surface has a plurality of holes in alignment with an existing plurality of fastening holes of the pressure relief device.

24. The shield of claim 22, further comprising a fastener mounted to each one of the plurality of holes for attaching the upper surface to an existing one of the plurality of fastening holes of the pressure relief device and fixedly securing the shield to the pressure relief device.

25. The shield of claim 22, further comprising an indicator attached to the cover and moveable in response to actuation of the pressure relief device.

26. The shield of claim 23, further comprising a semaphore moveable in response to actuation of the indicator.

27. The shield of claim 22, further comprising an adapter plate having an upper surface for engaging the seal, an opening extending through the plate, a first gasket mounted to the upper surface of the plate and surrounding the opening for sealing a pressure relief device to the plate, and a second gasket mounted to a lower surface of the plate and surrounding the opening, for sealing the plate to a transformer mounting surface.

28. The shield of claim 22, further comprising an integral mounting flange perpendicular to the wall and surrounding the edge.

29. The shield of claim 28, in which the flange comprises a plurality of mounting holes for fixedly attaching the shield to a mounting surface.

30. A shield for a pressure relief device comprising:

(a) a peripheral wall surrounding the pressure relief device having top and bottom edges, a generally flat wall portion and a port in the flat wall portion for coupling expelled fluids to a relief duct;

(b) a generally flat upper surface integral with the top edge of the peripheral wall;

(c) an adapter plate removably attached to the bottom edge of the peripheral wall, the adapter plate having an upper surface, a lower surface, an opening extending through the plate, and a peripheral edge around the plate;

(d) a first groove in the peripheral edge;

(e) a seal in the first groove for sealing the peripheral edge to the peripheral wall; and (f) a second groove in the peripheral edge between the first groove and the lower surface.

31. The shield of claim 30, further comprising a plurality of mounting holes adjacent the bottom edge of the peripheral wall and a plurality of fasteners in the plurality of holes for engaging the second groove.

32. The shield of claim 30, having a ledge extending from the peripheral edge adjoining the lower surface and the second groove.

33. The seal of claim 30, in which the adapter plate further comprises a first gasket mounted to the upper surface of the plate and surrounding the opening for sealing a pressure relief device to the plate, and a second gasket mounted to the lower surface of the plate and surrounding the opening, for sealing the plate to a transformer mounting surface.

\* \* \* \* \*